W. P. NELSON.
BREAD MIXER.
APPLICATION FILED JUNE 21, 1915.
1,157,576.
Patented Oct. 19, 1915.
2 SHEETS—SHEET 1.
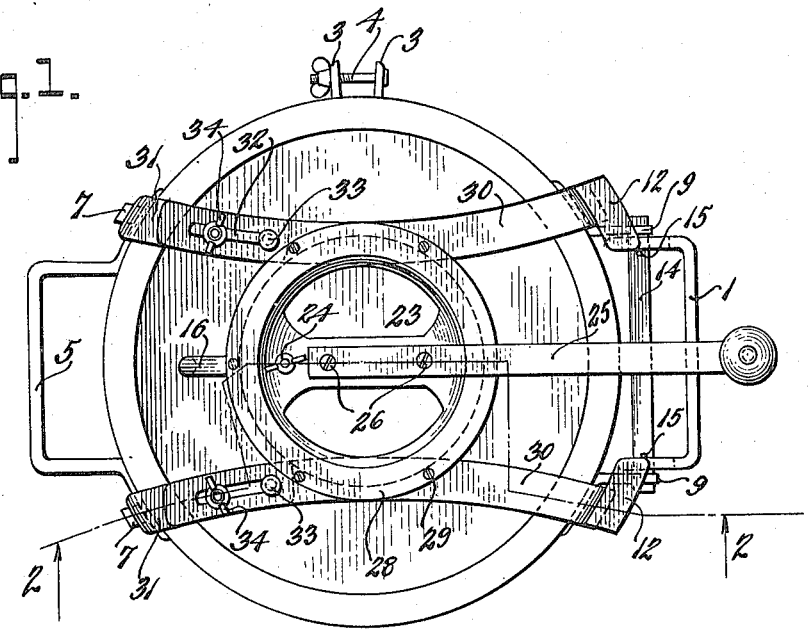
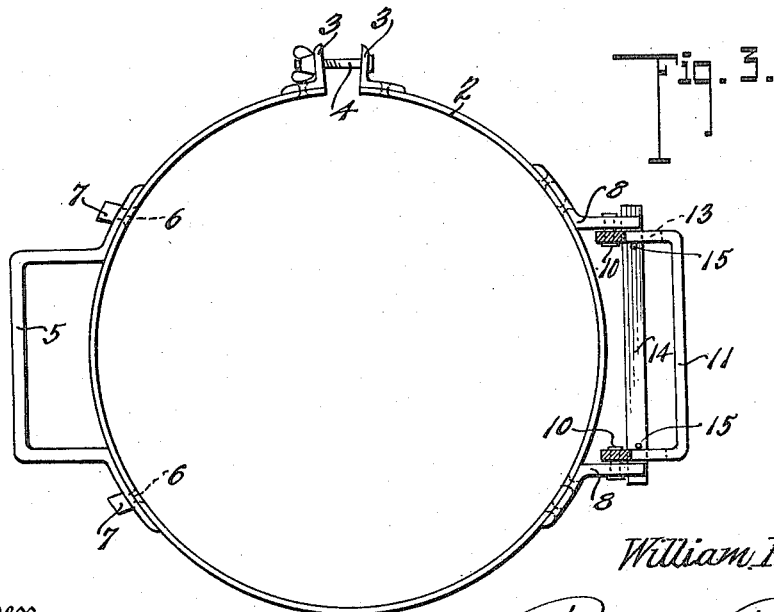
Witness
E. H. Wagner
Inventor
William P. Nelson
By Robb & Robb
Attorneys W. P. NELSON.
BREAD MIXER.
APPLICATION FILED JUNE 21, 1915.
1,157,576.
Patented Oct. 19, 1915.
2 SHEETS—SHEET 2.
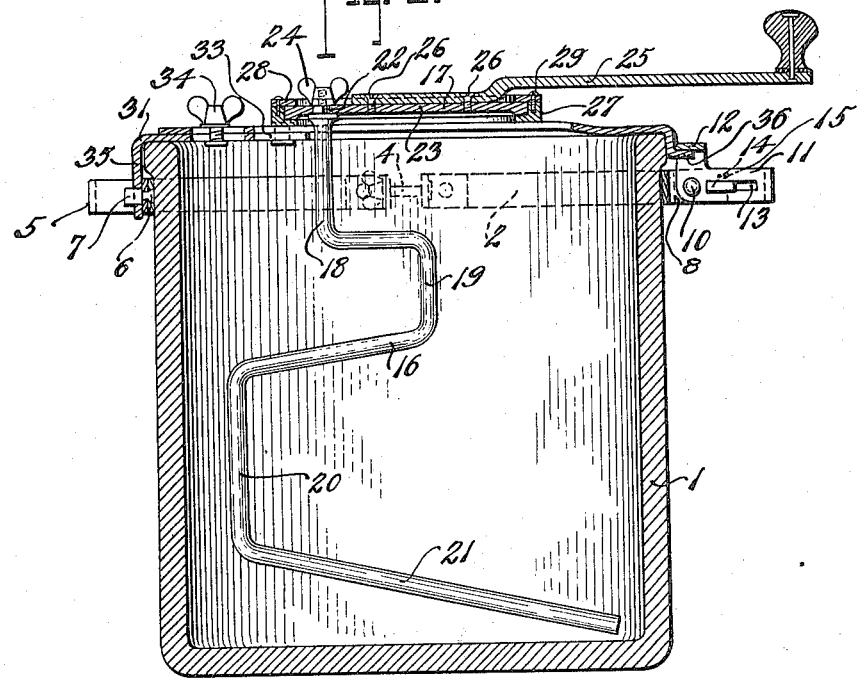
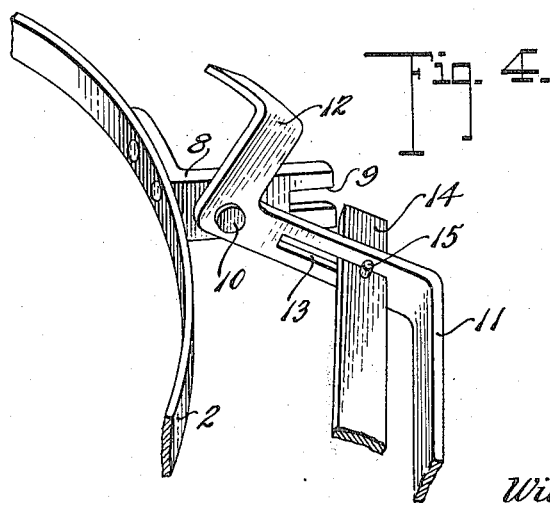
Inventor
William P. Nelson

UNITED STATES PATENT OFFICE.

WILLIAM P. NELSON, OF COLUMBIA FALLS, MONTANA.

BREAD-MIXER.

1,157,576.  Specification of Letters Patent.  Patented Oct. 19, 1915.

Application filed June 21, 1915. Serial No. 35,311.

*To all whom it may concern:*

Be it known that I, WILLIAM P. NELSON, a citizen of Denmark, residing at Columbia Falls, in the county of Flathead and State of Montana, have invented certain new and useful Improvements in Bread-Mixers, of which the following is a specification.

The present invention has reference broadly to mixing devices, and in particular to apparatus for mixing and kneading dough.

The main object of my invention is to provide a simple adjustable attachment capable of application to receptacles of varying capacities and comprising a dash or kneading member, operating means therefor, and means for securing these instrumentalities to the receptacle.

It is further comprehended to embody in the securing means just mentioned, manipulating members or handles for facilitating carrying of the receptacle and its contents, a handle constituting a locking device for securing the operating means in position, upon the said receptacle while permitting of its ready removal, as when it is desired to extract the kneaded dough from the vessel.

With the above and other objects in view, this invention consists in the construction, combination and arrangement of parts all as hereinafter fully described, claimed and illustrated in the accompanying drawings, wherein:

Figure 1 is a top plan of an apparatus embodying my invention. Fig. 2 is a vertical sectional view therethrough taken about on the line 2—2 of Fig. 1. Fig. 3 is a plan view of the receptacle engaging band and locking device carried thereby; and Fig. 4 is a fragmentary perspective view showing more clearly the construction of the locking device aforesaid.

Throughout the following detail description, and on the several figures of the drawings, similar parts are referred to by like reference characters.

Referring to the drawings, the numeral 1 designates a receptacle which may be of crockery or any other desired character of vessel adapted for the purposes of carrying out the functions of this apparatus. Adjacent to the mouth of the receptacle 1 and just below its thickened portion is disposed a receptacle engaging member or band 2, this member being an open ring terminating in offstanding ears 3 connected by an adjusting bolt 4. It will be apparent that this band may be attached upon vessels of different sizes or capacities by reason of the adjustability of the member 4 just mentioned. At one side, the band 2 is provided with a handle 5 attached to said band by fastening members 6 in the form of rivets or the like, these members being preferably provided with outer headed extremities 7 constituting attaching elements for parts hereinafter to be described. At the opposite side, the band has riveted thereto spaced offstanding arms or projections 8, the outer extremity of each of which is slotted as indicated at 9 (see Fig. 4). Between the arms 8 at 10 is pivoted a handle member 11 conforming substantially to the general form of the handle 5 excepting that said handle 11 is obviously a movable member whereas the handle 5 is fixed. The handle 11, at its pivoted extremities, is formed with an angularly shaped locking member 12 the function of which will be set forth more particularly as this description proceeds. The handle 11, furthermore, has its side members slotted longitudinally as indicated at 13 and movably or slidably mounted within said slots is a locking member or bar 14. The bar 14 is provided with studs 15 adjacent to the side members of the handle 11 which are designed to prevent displacement of the bar from the slots in which it is seated. It will be obvious by reference particularly to Figs. 3 and 4 of the drawings that the handle member 11 may be held in locked or fixed position by bringing said handle into the horizontal plane of the arms 8 and sliding the bar 14 into the slots 9 of said arms. The vessel or receptacle 1 may readily be handled when the parts are thus positioned for conveying the same together with its contents to points desired.

The mixing instrumentalities of this apparatus comprise primarily the dash or mixing member 16 and its operating means generally indicated 17. The former consists of the shank 18 which, when in position in the receptacle 1, is located at one side of the center, the mixing member being formed just below the shank with an upper offstanding loop 19 and just below with a lower loop 20 of larger size and offstanding in the opposite direction from the loop 19, finally terminating in the lower inclined portion 21 extending adjacent to the bottom of the receptacle and close to its side wall. By reference to Fig. 2, it will be observed that the loop 19 has its vertical portion disposed substantially centrally of the receptacle while the corresponding portion of the loop 20 lies adjacent to the side wall of the receptacle 1. This form of mixing member is very essential in an apparatus of this character inasmuch as it most effectively performs the mixing function which is desired with respect to a composition of dough material, the nature of which is such as to require a thorough kneading of the material to provide a homogeneous substance.

The shank 18 of the mixing member is formed with a squared end portion 22 adapted to be inserted in similarly shaped opening of an eccentric or disk 23, the threaded end of the shank receiving the thumb nut 24 which removably attaches the mixing member to said eccentric. The disk 23, furthermore, has secured thereto an operating crank handle 25, as by means of the fastening members or screws 26. The disk 23 is rotatably mounted in a channeled guide or body 27, having an annular cover plate or ring 28 removably attached to said guide and locking the disk in position in this member. For this purpose, screws or similar fastening means 29 pass through the ring 28 into the guide 27. The guide member 27 is carried by and fixed to the spaced horizontal supporting means or bars 30 each of which has an adjustable section 31 at one end. The main portion of each bar 30 is slotted as indicated at 32 and its coöperating adjustable section 31 is provided with a headed stud 33 extending into said slot and with an adjustable nut 34 for locking the adjustable section 31 in proper position. Obviously by expansion or contraction of these members, the supporting elements may readily be adapted for receptacles of different sizes. Each of the adjustable sections 31 is provided with an apertured downwardly bent extremity 35 adapted to be inserted over the heads 7 of the handle fastening members 6. At the opposite extremity each supporting member 30 is formed with a horizontal projection or seat 36 with which an angle shaped arm 12 of the movable handle 11 may be engaged to lock the supporting means for the operating means of this apparatus in position upon the receptacle 1. Obviously the handle is maintained in locked engagement with the ends of the supporting bars 30 when the locking bar 14 is seated in the slotted extremities of the arms 8. After performing its mixing function, the dash and its operating means may readily be removed from the receptacle by disengaging the handle 11 from the bars 30, yet said handles will be maintained in position for carrying the receptacle because of the fact that the receptacle engaging band 2 remains in position thereupon.

It will be apparent from the foregoing description that rotation of the handle 25 will cause the shank 18 of the mixing member to take an eccentric path and by reason of the peculiar formation of the said member the dough will be very effectively mixed.

The parts of this device are so connected together that they may be readily separated to facilitate the cleaning operation so essential in articles of this character and I believe that a very simple and desirable arrangement is embodied in the illustrated device though obviously slight changes may readily be made in the details of construction without departing from the spirit of the invention and within the scope of the appended claims.

Having thus described my invention, what I claim as new is:

1. In a dough mixing apparatus, the combination with a receptacle, of a mixing member, operating means therefor, means for attaching the operating means to the receptacle including a locking member, said locking member constituting a handle for the receptacle, and means movably mounted on said handle for holding it in locking position.

2. In a dough mixing apparatus, the combination with a receptacle, of a mixing member, operating means therefor, a supporting member for said operating means, a receptacle engaging member, and a movable locking member carried by the latter and adapted to engage the supporting member for holding the operating means in position on the receptacle, said locking member constituting a handle for the receptacle, arranged to assume engaging position upon application of lifting stress thereto.

3. In a dough mixing apparatus, the combination with a receptacle, of a mixing member, operating means therefor, a supporting member for said operating means, a receptacle engaging member, and a locking means carried by the latter and adapted to engage the supporting member for holding the operating means in position on the receptacle, said locking means comprising a movable handle and interlocking means for holding the handle in engaged position.

4. In a dough mixing apparatus, the combination with a receptacle, of a mixing member, operating means therefor, supporting means for the operating means detachably connected to the receptacle at one side, means arranged at the opposite side of the receptacle adapted for engagement with the supporting means at the other side to hold said supporting means on the receptacle, and a locking bar movably carried by the engaging means for holding it in engaging position.

5. In a dough mixing apparatus, the combination with a receptacle, of a mixing member, operating means therefor, an annular band surrounding the receptacle, a handle, fastening members securing the handle to the band and having extensions, and supporting members for the operating means detachably connected to the extensions of said handle fastening members aforesaid.

6. In a dough mixing apparatus, the combination with a receptacle, of a mixing member, operating means therefor, an annular band surrounding the receptacle, supporting means for the operating means aforesaid detachably connected to the band at one side, a handle movably connected to the band at the other side and adapted to engage the supporting means aforesaid, and a locking member movably mounted on the handle and adapted to interlock with the band for holding the handle in its engaged position.

7. In a dough mixing apparatus, the combination with a receptacle, of a mixing member, operating means therefor including a rotating handle, spaced supporting bars for holding the operating means on the receptacle, an annular band surrounding the receptacle and provided with a handle at one side, fastening members for said handle with which the supporting bars are removably engaged at one end thereof, means for adjusting the supporting bars to accord with receptacles of different sizes, and locking means engageable with the other ends of the supporting bars, said locking means comprising a slotted handle member having locking extremities and a locking bar disposed in its slots adapted to coöperate with the annular band aforesaid for holding the supporting members in proper supporting position.

8. In a dough mixing apparatus, the combination with a receptacle, of a mixing member disposed within the receptacle, means for operating said mixing member comprising a disk to which the mixing member is eccentrically connected and a crank handle connected to the disk for rotating the same, and a channeled guide for said disk supporting the operating means and in which the disk is revolubly mounted.

9. In a dough mixing apparatus, the combination with a receptacle, of a mixing member disposed within the receptacle, means for operating said mixing member comprising a disk to which the mixing member is eccentrically connected and a crank handle connected to the disk for rotating the same, a clamping nut for connecting the mixing member to the disk, a channeled guide in which said disk is rotatably mounted, and a removable cover plate for holding the disk from displacement from the guide member.

10. In a dough mixing apparatus, the combination with a receptacle, of a mixing and kneading member comprising a shank eccentrically mounted in the receptacle, said member being formed with an upper offstanding loop disposed centrally in the receptacle and a lower loop offstanding in an opposite direction and disposed laterally of the receptacle for movement adjacent to its wall, and operating means for moving the shank aforesaid in an eccentric path.

In testimony whereof I affix my signature.

WILLIAM P. NELSON.

Copies of this patent may be obtained for five cents each, by addressing the "Commissioner of Patents, Washington, D. C."